Nov. 2, 1971  C. F. GULLICKSON  3,616,723
MUSIC SYSTEM WITH CLIPS
Filed Aug. 15, 1969  2 Sheets-Sheet 1
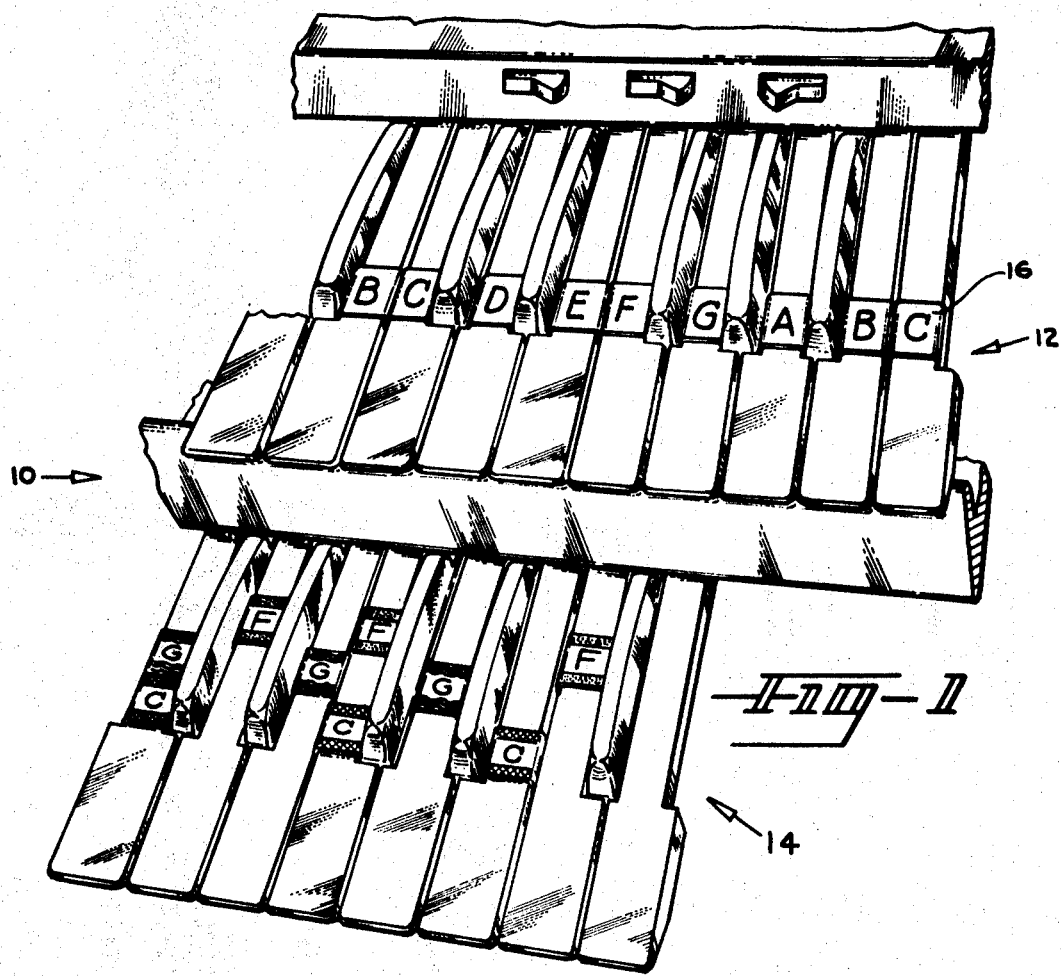
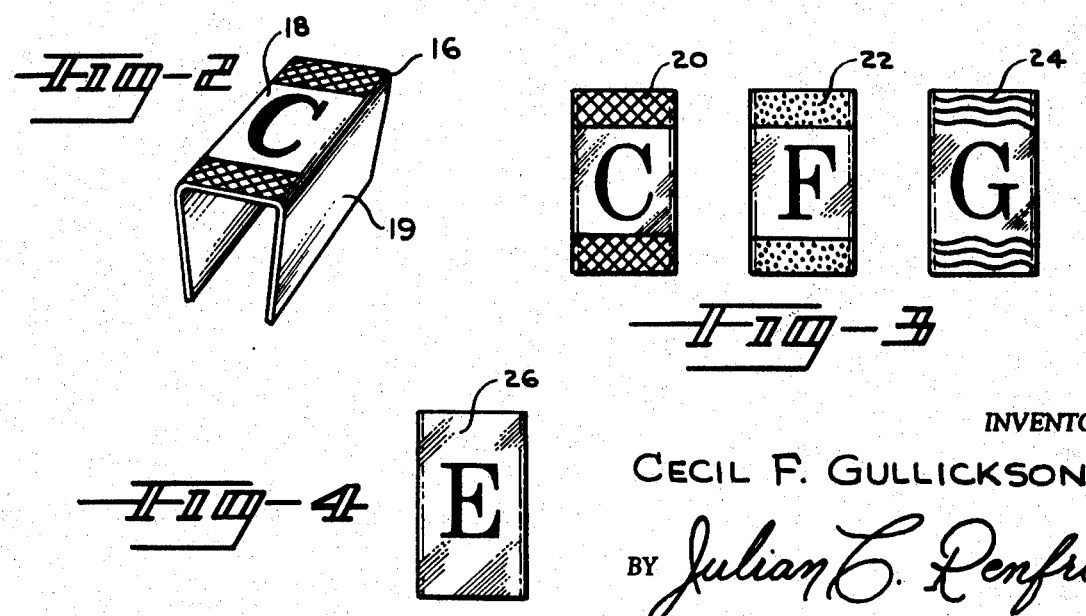
INVENTOR
CECIL F. GULLICKSON
BY Julian C. Renfro
ATTORNEY Nov. 2, 1971  C. F. GULLICKSON  3,616,723
MUSIC SYSTEM WITH CLIPS
Filed Aug. 15, 1969  2 Sheets-Sheet 2
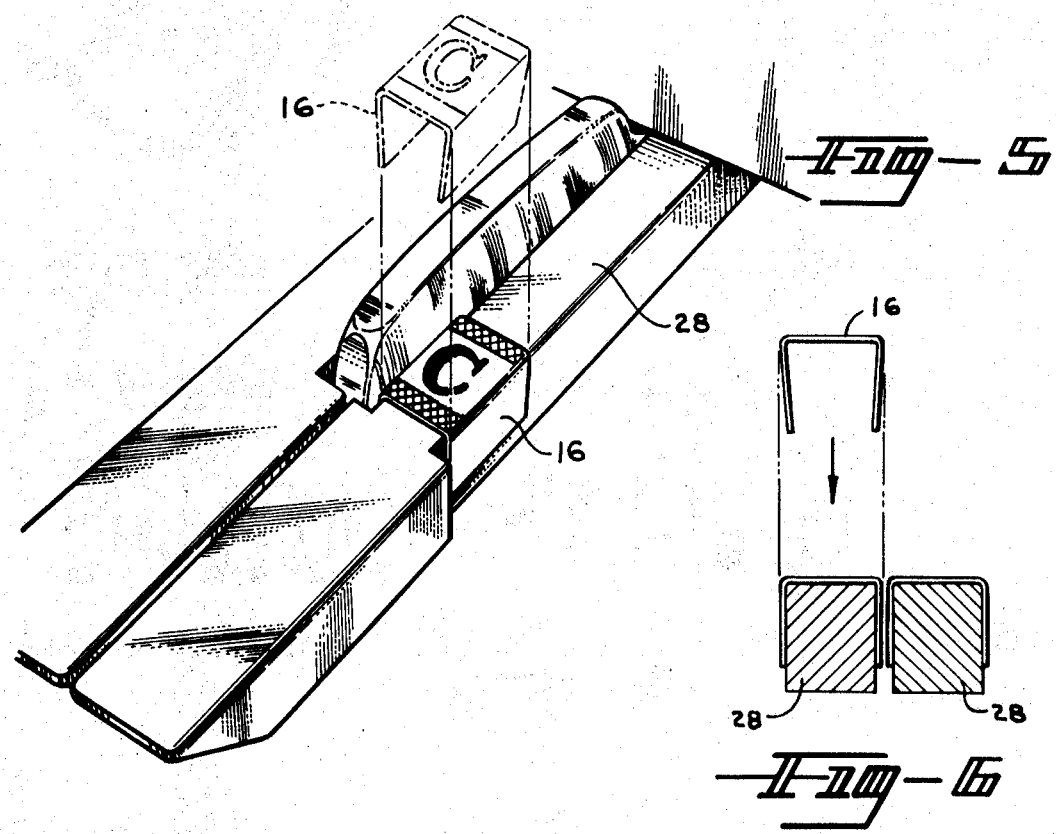
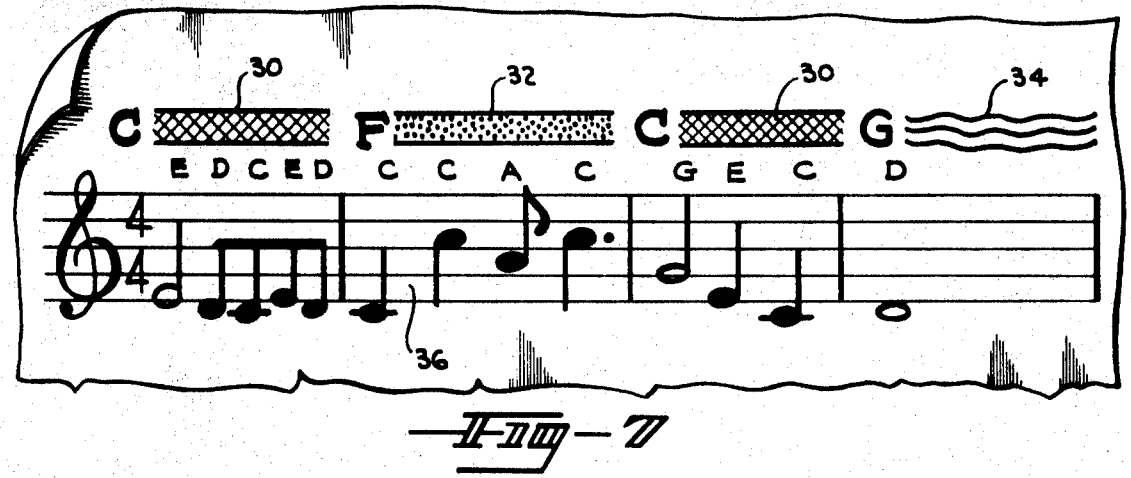
 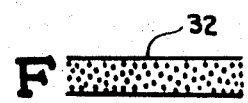 
INVENTOR
CECIL F. GULLICKSON
BY Julian C. Renfro
ATTORNEY

United States Patent Office 3,616,723
Patented Nov. 2, 1971

3,616,723
MUSIC SYSTEM WITH CLIPS
Cecil F. Gullickson, 2018 Fosgate Drive,
Winter Park, Fla. 32789
Filed Aug. 15, 1969, Ser. No. 850,473
Int. Cl. G09b 15/02
U.S. Cl. 84—478                                4 Claims

ABSTRACT OF THE DISCLOSURE

An arrangement of clips or tabs to be applied to the keyboard of a musical instrument so as to simplify an identification of the keys constituting certain chords, as well as identifying individual keys. These clips or tabs may be easily removed when the musician has become familiar with the keyboard, inasmuch as they do not in any way mar the keys. They are not prone to become accidentally displaced. Clips associated with an identification of typical chords may carry a certain code or identification that may be carried over to the sheet music, thus to enable the user to tell at a glance which is the right chord to play in a given instance.

---

This invention relates to a music system involving a group of individual clips or tabs arranged to be fastened upon the keys of a keyboard of a musical instrument such as a piano or organ to enable an amateur musician or a person having little or no musical knowledge to quickly locate basic chords as well as certain individual keys.

In the past, a number of attempts have been made to assist those learning to play a piano or similar musical instrument, and these attempts have included many types of ideas, such as the use of tapes or strips to be appended to the keys, and lighting arrangements to be placed under the keys in order that certain rapid identifications can be made. However, many of these procedures involved a defacing of the keys or else were so insecurely mounted that often such devices fell off and became misplaced. The lighting arrangement is generally more satisfactory, but it entails considerably more expense, and in most instances can be installed only at the factory.

In accordance with the present invention I have evolved a basic clip or tab arrangement that can be used to identify several basic chords as well as individual keys easily and dependably, with little expense being involved. The chord clips and key clips can all be of a similar size, but with some of the clips bearing the letter corresponding to the names of a number of the white keys of the keyboard, whereas others are marked in such a way as to be used in groups of three or four in order to identify certain basic chords with which the beginner would likely be concerned. The face portion of each key clip therefore will typically bear only a single letter designating a given white key of the piano, whereas the chord clips would each bear thereon a "C," an "F" or the like, thus to be used in a group to identify the chord. Further, the chord clips may well bear additional indicia thereon, so as to facilitate a quick recognition of each chord. For example, the three chord clips associated with a "C" chord may utilize thereon a certain type of cross-hatching top and bottom, whereas the "F" clips can for example utilize dots, and the "G" clips utilize wavy lines. This exemplary coding arrangement not only speeds a recognition of the particular chords, but also may be carried forward into the musical score so that the beginner by noting cross hatching above one bar of music can know to play a "C" chord, and by noting wavy lines may know to play a "G" chord, and so on.

In other words, by this arrangement I have obtained all the advantages of a very expensive key and chord identification arrangement while at the same time obtaining such advantages very economically, with no defacing of keys or impairment of key action involved.

It is therefore a principal object of my invention to provide an economical, dependable and highly satisfactory key and chord identification arrangement that may be easily and quickly installed on any keyboard instrument, and that will enable someone with or without prior musical knowledge to quickly learn to play elementary melodies with chordal accompaniment.

These and other objects, features and advantages of my invention will be obtained from an inspection of the drawings in which:

FIG. 1 is a perspective view of a typical two keyboard arrangement illustrating how my novel chord clips and key clips may be utilized;

FIG. 2 depicts a perspective view of a typical chord clip to a larger scale, with the sides of the clip being angled in order for the clip to be retained in place on its key without the use of glue;

FIG. 3 reveals an array of chord clips, with the faces of these clips containing indicia that may be related with the musical score;

FIG. 4 is a view of the face of a key clip, which typically contains a key designation but not any indicia, and which is customarily approximately the same size as the chord clips;

FIG. 5 is a perspective view to larger scale of a typical pair of adjacent white keys, with the chord clip being shown in exploded relation;

FIG. 6 reveals a cross-sectional view of two adjacent white keys, with the arrangement of clips being such as to avoid interference;

FIG. 7 is a portion of a musical score which has been prepared so as to include the indicia associated with certain chords so that the pianist or organist can tell at a glance what chord should be played with each measure of music; and FIG. 8 reveals an exemplary chord coding that may be used.

Referring first to FIG. 1 it will be noted that I have there illustrated a typical two manual keyboard arrangement 10, involving a swell manual 12 and a great manual 14. It will of course be understood that the great manual is typically played by the left hand, and used for forming chords, whereas the swell or upper keyboard 12 is used in connection with the right hand to supply the melody.

Upon the rear or narrow portion of certain white keys of the lower keyboard I have disposed a number of spring clips or tabs in order to identify certain basic chords, whereas upon the upper keys similar clips or tabs are used to identify the individual keys to be played by the right hand. Both types of clips may be approximately of the same size.

As will be noted from reference to FIGS. 2, 5 and 6, these clips or tabs 16 have an upper face 18 upon which letters appear, as well as side portions 19, slanted inwardly, which are employed to grip the sides of the rear portions of the white keys to which they are applied. The clips are of springy construction, being made of thin plastic, thin metal, or other suitable material, with the side portions 19 being sufficiently thin that contact is not made between the side portions of the tabs, even when applied to adjacent white keys 28. FIG. 6 reveals that the clip 16 has sides 19 that normally slant inwardly, which sides of course reside tightly along the cross section of the rear portion of the white key over which they are applied.

Referring back to FIGS. 2 and 3, it will be noted that the faces 18 of the clips utilized in connection with the lower keyboard have an indicia thereon in addition to the letters used in connection with the chord designation. For example, the indicia 20 used in connection with C chord clips may for example be cross-hatching, whereas the indicia 22 used in connection with the clips associated with the F chord may involve dots, and the indicia 24 used in connection with the G chord clips may be wavy lines. It is to be understood that many other patterns could be used instead of those illustrated, to achieve the same purpose. In contrast, FIG. 4 reveals a face 26 of a clip used in connection with an identification of the individual keys, from which the indicia is missing.

FIG. 5 reveals the manner in which a user may insert a typical chord clip 16 upon the rear portion 28 of a white key that is a part of the particular chord being identified. It is but a simple matter for the user to spread apart the sides of the clip slightly and then insert it over the rear portion of the appropriate key. FIG. 1 reveals that certain of the white keys are associated with more than one chord, in which event two or more chord clips may be placed upon the same key. Significantly, the clips do not mar or in any way permanently deface the keys, nor do they become accidentally displaced in normal use.

It is of course up to the user how the chord clips are deployed, and he or she may for example wish to place the chord clips associated with the C chord near the front end of the narrow portion of the white keys; the chord clips associated with the F chord near the rear of the white keys, and the chord clips associated with the G chord approximately mid-way between the other two. This of coruse is set forth merely by way of example, and the manner in which the chord clips are used may obviously vary from user to user.

FIGS. 7 and 8 reveal the use of typical indicia that may be used in connection with the aforementioned C, F and G chords, and also the manner in which the indicia may appear in a selected manner above the various measures of music 36 in order to simplify the user being able to supply the chord appropriate to the melody being played with the right hand. In this particular example, the indicia 30 associated with the C chord may appear above say the first and third measures of the music, the dots associated with the indicia 32 of the F chord may appear above say the second measure of the music, and the wavy line indicia 34 associated with the G chord may appear above the fourth measure, and so on throughout the rest of the piece of music.

As previously indicated, the key clips 16 used on the upper keyboard simplify the beginner finding the appropriate notes with his right hand in accordance with the note callouts located above each measure of the music. The key clips may be of the same approximate size as the chord clips, and of the same construction except for the indicia.

As should now be apparent, my novel music system utilizing clips will prove very beneficial to musicians having a lack of familiarity with a piano or organ keyboard inasmuch as a rapid and accurate identification of keys and chords can be obtainable very economically, while at the same time not impairing the beauty or action of the keys of the keyboard. These clips can be used on musical instruments having only a single keyboard, or quite obviously can be utilized on dual or multi-manual arrangements. It should be noted that my novel clips are adaptable for use on any keyboard merely by spacing the legs in a desired manner. Obviously, the keyboard can be made of keys of any conventional material, such as wood, or synthetic materials.

Although I envision these clips or tabs being made of thin plastic, thin metal, or other suitable springy material, thus not impairing key action or the rubbing together of adjacent clips, it is within the spirit of my invention to utilize clips whose left legs are configured differently than their right legs, thus to enable the legs of adjacent clips to always be in staggered relation, thus doubly insuring against any undesirable contact.

The indicia utilized on the chord clips can vary widely in accordance with customer tastes and cost of the clips, but in all instances should be effective to enable the pianist or organist to quickly associate the several keys relatable to each chord, and the chords relatable to the various measures of the musical score.

Other variations upon my invention will be apparent to those skilled in the art, and I am of course not to be limited to the constructions described and illustrated herein except as required by the scope of the appended claims.

I claim:

1. An identifying clip to be removably applied upon a certain key of a keyboard of a musical instrument in order to identify either the particular musical note or else the chord to which the key belongs, said clip comprising a face portion and a pair of spaced apart side portions, said face portion being arranged to carry thereon an identification of the key or chord involved, whereas the side portions are arranged to extend down along the sides of the key and grip it tightly so as not to be displaced during normal use.

2. The identifying clip as defined in claim 1 in which the face of the clip in addition to utilizing a letter of the alphabet identifying the key or chord, also contains indicia relatable to similar indicia on the musical score, thus showing the user at a glance which chord is to be identified with a given measure of music.

3. Identifying clips to be removably applied upon certain keys of a keyboard of a musical instrument in order to identify either the particular musical notes or else the chords to which the keys belong, said clips each comprising a face portion and a pair of spaced apart side portions, said face portions being arranged to carry thereon the identification of the keys or chords involved, whereas the side portions are arranged to extend down along the sides of the keys and grip them tightly so as not to be displaced during normal use.

4. The identifying clips as defined in claim 3 in which the faces of the clips in addition to utilizing letters of the alaphabet identifying the keys or chords, also contain indicia relatable to similar indicia on the musical score, thus showing the user at a glance which chord is to be identified with a given measure of music.

References Cited

UNITED STATES PATENTS

| 1,340,569 | 5/1920 | Siegel | 84—423 |
| 2,072,511 | 3/1937 | Ross | 84—470 |
| 2,221,143 | 11/1940 | Lang | 84—478 |
| 3,430,530 | 3/1969 | Grindinger | 84—477 |

RICHARD B. WILKINSON, Primary Examiner

L. R. FRANKLIN, Assistant Examiner

U.S. Cl. X.R.

84—485